United States Patent Office 3,549,756
Patented Dec. 22, 1970

3,549,756
ANTITRICHOMONAL COMPOSITIONS CONTAINING 1-SUBSTITUTED - 2 - MORPHOLINYL OR THIAMORPHOLINYL-5-NITROIMIDAZOLES
Dale R. Hoff, Cranford, N.J., and David W. Henry, Menlo Park, Calif., assignors to Merck & Co., Inc., Rahway, N.J., a corporation of New Jersey
No Drawing. Continuation-in-part of application Ser. No. 565,333, June 17, 1966, which is a division of application Ser. No. 355,428, May 27, 1964, now Patent No. 3,299,090. This application Mar. 29, 1968, Ser. No. 717,364
Int. Cl. A61k 9/02, 9/04, 27/00
U.S. Cl. 424—248    2 Claims

ABSTRACT OF THE DISCLOSURE

Antiparasitic compositions containing a 1-substituted-2-aminoalkyl - 5 - nitroimidazole or a 1-substituted -2-substituted-aminoalkyl-5-nitroimidazole.

---

This application is a continuation-in-part of applicants' copending application Ser. No. 565,333, filed June 17, 1966, now abandoned, which in turn is a division of application Ser. No. 355,428, filed Mar. 27, 1964, now United States Pat. No. 3,299,090.

This invention relates to new nitroimidazoles. More particularly, it is concerned with 2-($\alpha$-aminoalkyl)-nitroimidazoles. Still more specifically, it is concerned with 2-substituted-2-aminoalkyl - 5 - nitroimidazoles, with 1-substituted - 2 - substituted-aminoalkyl - 5 - nitroimidazoles and with methods for the chemical synthesis of such new compounds. It relates further to the use of such substances against parasitic infections and to anti-parasitic compositions containing such substances as active ingredients.

Although various nitroimidazole compounds have been described as useful against certain parasitic diseases, in particular against the poultry disease histomoniasis and the protozoal infection trichomoniasis, the search has continued for new, more active and less toxic agents for the treatment of these diseases.

Trichomoniasis is a disease caused by the protozoan parasite *Trichomonas vaginalis*. *T. vaginalis* primarily infests the human vagina and is the etiological agent of a very troublesome and prevalent form of vaginal infestation known as *T. vaginalis* vaginitis. The drugs heretofore commercially available for treating this condition have certain limitations and disadvantages. In particular, there has been a need for an anti-trichomonal substance that is effective when administered orally as well as topically.

Histomoniasis is a poultry disease caused by the protozoan parasite *Histomonas meleagridis*. This disease, which affects turkeys, is also known as turkey blackhead or enterohepatitis. It is a serious economic problem to the turkey-raising industry since it spreads rapidly in turkey flocks and the mortality rate may be as high as 80%. The compounds now commercially available for treating turkey blackhead are of benefit, but none of them has proven to be entirely satisfactory. Among the disadvantages are development of resistant strains of the infecting organism, and undesired side effects when fed to the birds at the levels required to treat the disease.

It is an object of the present invention to provide a new class of antitrichomonal and antihistomonal agents. It is a further object to provide a new and novel class of nitroimidazoles having a significant degree of antiprotozoal activity. Another object is provision of 2-substituted-5-nitroimidazoles having an $\alpha$-aminoalkyl or $\alpha$-substitutedaminoalkyl group at the 2-position of the imidazole ring. An additional and more specific object is provision of 2-aminomethyl-5-nitroimidazoles and 2-substituted-aminomethyl-5-nitroimidazoles having a lower alkyl, hydroxyloweralkyl or acyloxyloweralkyl radical at the 1-position of the imidazole ring. Another object of the invention is provision of methods for making such 1,2-disubstituted-5-nitroimidazoles. An additional object is provision of antitrichomonal and antihistomonal compositions containing the imidazole compounds of this invention as active ingredients. A still further object is provision of methods for treating and/or preventing trichomoniasis and histomoniasis by administration of the novel imidazoles of this invention. Other and more specific objects will become clear from the following description of our invention.

The novel 1-substituted-2-aminoalkyl-5-nitroimidazole compounds of this invention are represented by the structural formula

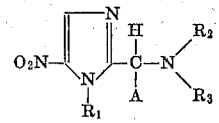

wherein A represents hydrogen or a loweralkyl radical having from 1 to 5 carbon atoms, i.e. methyl, ethyl, propyl, butyl or amyl; $R_1$ represents a loweralkyl radical having from 1 to 5 carbon atoms, i.e. methyl, ethyl, propyl, butyl or amyl, or a radical of the structure —$(CH_2)_nOY$ where $n$ is a whole integer having a value of 2, 3 or 4 and Y represents hydrogen or an acyl group, such as a lower alkanoyl group having from 2 to 4 carbon atoms, i.e. acetyl, propionyl, butyroyl, or a benzoyl radical or a substituted benzoyl radical such as p-halo- or p-nitro-benzoyl. Further, A is loweralkyl only where $R_1$ is loweralkyl. In the preferred compounds of the invention, $R_1$ is methyl or a 2-hydroxyethyl radical and $R_1$ and A may represent the same or different loweralkyl radicals.

At the 2-position of the imidazole ring of the compounds of this invention there is present an aminomethyl or substituted aminomethyl group, as shown in the above formula where A represents hydrogen. Alternatively, the 2-position may contain an $\alpha$-aminoalkyl or $\alpha$-substituted-aminoalkyl radical of at least two carbon atoms, i.e. the compounds represented by the formula where A represents loweralkyl. In either case, the end compounds of the invention have an amine or substituted-amino group on an alkyl group in the 2-position.

The moiety —$NR_2R_3$ in the above formula represents amino, loweralkylamino or diloweralkylamino such as methylamino, dimethylamino, ethylamino, isopropylamino, dibutylamino and diethylamino; arylamino such as anilino, naphthylamino, p-nitroanilino or p-methylanilino; aralkylamino such as benzylamino; loweralkenylamino, e.g. allylamino or methallylamino; cycloalkylamino, having up to 6 carbon atoms in the cycloalkyl group, examples of which are cyclopentylamino, cyclopropylamino and cyclohexylamino; acylamino, and particularly loweralkanoylamino such as acetylamino, propionylamino and butyroylamino, or benzoylamino. Alternatively, —$NR_2R_3$ represents a five- or six-membered nitrogen containing heterocyclic ring wherein the nitrogen atom of —$NR_2R_3$ is part of the heterocyclic ring and $R_2$ and $R_3$ together represent the rest of the ring. Thus, —$NR_2R_3$ represents radicals such as N-morpholinyl, N-thiamorpholinyl, N-piperidyl, N-pyrrolidinyl, 1-piperazinyl, 1-imidazolyl, 2-sym or 2-vic triazolyl, N-pyrryl, 1-pyrazolyl, N-pyrrolidenyl, N-$\alpha$-pyridonyl of the structure

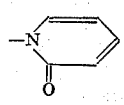

N-pyridonyl of the formula

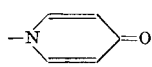

1-(2-pyrazolonyl) of the formula

and 1-(2-imidazolonyl) of the formula

In all of the above ring systems a ring nitrogen atom is attached directly to the α-carbon in the 2-position of the 5-nitroimidazole. The above enumeration of suitable heterocyclic rings in the meaning of —NR$_2$R$_3$ is intended to be exemplary and not an exhaustively complete list.

In order to prepare the compounds of the above formula by the process described hereinafter, the nitrogen containing reactant must have at least one reactive hydrogen on the nitrogen atom. Thus, for example, an aromatic six-membered nitrogen-containing heterocycle such as pyridine will not react in the process of the invention, and —NR$_2$R$_3$ does not include such substances.

Also within the purview of the invention are acid addition salts of the 1-substituted-2-aminomethyl-5-nitroimidazoles of the above formula. The preferred salts are the relatively non-toxic mineral acid salts such as the hydrochlorides, sulfates, and nitrates. Organic acid salts, such as the acetate, citrate, tartrate, oxalate and the like, may also be prepared of those compounds in which the —NR$_2$R$_3$ group is not an acyl type substituent. In some cases, it may be preferred to employ these products in the salt rather than the free base form in treating the parasitic diseases previously mentioned.

The compounds of the present invention are prepared from 1-substituted-2-hydroxymethyl-5-nitroimidazole according to a process which comprises broadly the reaction of said 2-hydroxymethyl imidazole with a halogenating agent to obtain a 1-substituted-2-halomethyl-5-nitroimidazole, and reaction of such halomethyl imidazole with an amine to produce a 1-substitued-2-substituted aminomethyl-5-nitroimidazole. This process is employed for the preparation of most of the aminomethyl (and α-aminoalkyl) compounds of the invention. Some modifications, which will be discussed hereinafter, are preferred in the second step of this synthesis for preparation of 1-substituted-2-aminomethyl-5-nitroimidazole itself (where —NR$_2$R$_3$ in the above formula represents NH$_2$), and of the aralkylaminomethyl imidazoles such as the 1-substituted-2-benzylaminomethyl-5-nitroimidazole.

According to the first reaction of this invention 1-loweralkyl - 2 - (α-hydroxyl) loweralkyl - 5 - nitroimidazole or 1 - (acyloxyalkyl) - 2 - hydroxymethyl - 5 - nitroimidazole is intimately contacted with a halogenating agent in order to convert the 2-hydroxymethyl substituent to a 2-halomethyl radical. It is preferred to form either the chloromethyl, bromomethyl or iodomethyl imidazole by treating the starting material with the appropriate halogenating agent. When the starting material contains a hydroxyalkyl group at the 1-position, this group is "blocked" by acylation prior to the halogenation step in order to prevent undesired side reaction. This is accomplished by converting the hydroxyalkyl moiety to a benzoyloxy or lower alkanoyloxy derivative via treatment with an acylating agent. This halogenation reaction and the subsequent treatment of the 1-substituted-2-haloalkyl - 5 - nitroimidazole with an amine is carried out in the same fashion on compounds of the above formula where A represents H or loweralkyl. For the sake of simplicity, the ensuing description of these processes will be directed primarily to the preparation of substances of the above formula where A represents hydrogen, although it will be understood that it applies as well to the haloalkyl and aminoalkyl imidazoles of the compounds where A represents loweralkyl.

Suitable chlorinating agents which may be used satisfactorily in this reaction are thionyl chloride, aqueous concentrated hydrogen chloride, phosphorous oxychloride, phosphorous pentachloride and phosphorous trichloride. The preferred brominating agents are aqueous concentrated hydrogen bromide, thionyl bromide or phosphorous tribromide. Hydrogen iodide is conveniently employed as halogenating agent to make the 2-iodomethyl compounds. This aspect of the invention is not limited to these particular halogenating agents and other equivalent halogenating agents may be used if desired. The halogenation is brought about by intimately contacting the 1-substituted - 2 - hydroxymethyl - 5 - nitroimidazole and the halogenating agent in a suitable reaction medium. An excess of halogenating agent is generally used, and where such reagents are liquid and easily removed at the completion of the reaction, the excess halogenating agent itself may serve as the solvent medium. This is convenient, for example, when thionyl chloride is used as the reagent. It is generally preferred, however, to carry out the reaction in an organic solvent which is inert under the reaction conditions. Examples of such solvents are aromatic hydrocarbons such as benzene, toluene, xylene, and the like, chloroform, dimethoxymethane and methylene chloride. The time and temperature of the reaction are not critical and halogenation may be carried out at room temperature or at elevated temperature. Reaction temperatures of from about room temperature to about 75° C. give very satisfactory results and under these conditions the halogenation is essentially complete in from about 15 minutes to 3 hours. The 1-substituted-2-halomethyl-5-nitroimidazole is formed as an acid addition salt, i.e. as the hydrochloride or hydrobromide. The acid addition salts of these nitroimidazoles are much more highly crystalline than are the free bases and for this reason it is preferred to isolate the salts. The imidazole free base is obtained by treating an aqueous solution of the salt with base and extracting the resulting imidazole base into an organic solvent such as chloroform. If desired, these 2-halomethyl-5-nitoimidazoles having a 1-acyloxyalkyl radical may be hydrolyzed with acid to the corresponding 1-hydroxyalkyl compounds although, as previously stated, it is preferred to carry out the amine reaction prior to the acid hydrolysis.

Representative example of 2-haloalkylimidazoles provided by this invention are 1-methyl-2-bromoethyl-5-nitroimidazole, 1-ethyl-2-iodomethyl - 5 - nitroimidazole, 1-methyl - 2 - (α-chloromethyl)-5-nitroimidazole, 1-(β-acetoxyethyl) - 2 - chloromethyl - 5 - nitroimidazole, 1-propyl - 2 - chloromethyl - 5 - nitroimidazole, and 1-(γ-benzoyloxypropyl)-2-bromomethyl-5-nitroimidazole.

The 1-substituted - 2 - halomethyl - 5 - ntiroimidazole compounds obtained as described above are converted to the corresponding 2-substituted aminomethyl imidazoles by treatment with a primary or secondary amine:

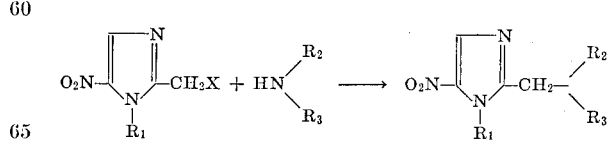

In the above formula X represents a halogen having an atomic weight greater than 35, i.e. chloro, iodo or bromo, R$_1$ represents loweralkyl or (CH$_2$)$_n$OY, where $n$ is 2-4 and Y is hydrogen or acyl; and —NR$_2$R$_3$ is as previously defined except that at least one or R$_2$ and R$_3$ is other than hydrogen. In a similar manner, compounds wherein a hydrogen atom of the 2-methylene group is replaced by an alkyl group are obtained from the corresponding 2-(α-haloalkyl)imidazole.

This reaction is brought about by intimately contacting the 2-halomethyl-5-nitroimidazole with an excess of a primary or secondary amine. As will be clear to those skilled in this art, the particular substituted-aminomethyl-5-nitroimidazole produced is directly dependent on the amine employed as a reactant. It is preferred to employ a molar excess of primary or secondary amine for reaction with the halomethyl imidazole. At least a 2:1 molar ratio of amine to halomethyl imidazole is used for best results in this process, and in many cases molar ratios of up to 15:1 are desirable. When the 1-substituted-2-halomethyl-5-nitroimidazole is charged to the reaction as an acid addition salt instead of the free base, additional amine is required to neutralize the acid salt, and the amount of amine reactant is increased appropriately.

The process is carried out in a suitable solvent medium. It is preferred to employ an organic solvent that is non-reactive with either the halomethyl imidazole or the amine reactants. Examples of suitable solvents are the aromatic hydrocarbons such as benzene, toluene or xylene, diloweralkyl amides such as dimethylformamide or dimethylacetamide, a lower alkanol, e.g. methanol, ethanol or isopropanol, an aqueous lower alkanol, chloroform, acetonitrile or a ketone such as acetone, methylethyl ketone or methyl isobutyl ketone. In those cases where the amine reactant is liquid at the reaction temperature, an excess of such amine can serve as the solvent medium.

The reaction time and temperature are not critical features of the process except to the extent that it is convenient, and preferred, that the temperature be one at which the reactants are liquids. In the case of low boiling amines such as methylamine and dimethylamine, the reaction is generally carried out in the cold. However, with most primary and secondary amines elevated temperatures of up to about 150° C. are employed since the reaction rate is thereby increased. Formation of the 1-substituted-2-substituted-aminomethyl-5-nitroimidazole compounds takes place rapidly, and in most cases the reaction is substantially complete in from ½ to 2 hours, although longer times may be utilized if desired.

The resulting imidazole may be recovered by techniques known to those skilled in this art. Where the product is soluble in the reaction medium, the solvent and unreacted excess amine may be distilled off, the desired imidazole extracted into a suitable nonaqueous solvent such as chloroform or ethyl acetate, and then recovered in substantially pure form by removal of the solvent by distillation.

Representative examples of 1-substituted-2-(α-substituted-amino)-alkyl-5-nitroimidazoles obtained in this fashion by the reaction of a 1-substituted-2-(α-haloalkyl)-5-nitroimidazole with a primary or secondary amine are:

1-methyl-2-anilinomethyl-5-nitroimidazole,
1-methyl-2-morpholinomethyl-5-nitroimidazole,
1-methyl-2-diethylaminomethyl-5-nitroimidazole,
1-ethyl-2-ethylaminomethyl-5-nitroimidazole,
1-propyl-2-cyclohexylaminomethyl-5-nitroimidazole,
1-methyl-2-allylaminomethyl-5-nitroimidazole,
1-methyl-2-(1-imidazolylmethyl)-5-nitroimidazole,
1-methyl-2-(β-ethoxyethyl)aminomethyl-5-nitroimidazole,
1-(2-acetoxyethyl)-2-morpholinomethyl-5-nitroimidazole,
1-(4-acetoxybutyl)-2-morpholinomethyl-5-nitroimidazole,
1-(2-hydroxyethyl)-2-morpholinomethyl-5-nitroimidazole,
1-methyl-2-(α-morpholinoethyl)-5-nitroimidazole,
N-(1-methyl-5-nitro-2-imidazolylmethyl)-pyrrolidone,
N-(1-ethyl-5-nitro-2-imidazolylmethyl)-α-pyridone,
N-(1-methyl-5-nitro-2-imidazolylmethyl)-pyrazolone,
N-(1-propyl-5-nitro-2-imidazolylmethyl)-kojic acid,
N-(1-methyl-5-nitro-2-imidazolylmethyl)-thiazolone,
1-(3-acetoxypropyl)-2-methylaminomethyl-5-nitroimidazole,
1-(2-benzoyloxyethyl)-2-allylaminomethyl-5-nitroimidazole,
1-(2-acetoxyethyl)-2-(α-anilinoethyl)-5-nitroimidazole, and
2-methyl-2-thiamorpholinomethyl-5-nitroimidazole.

The 1-acyloxyalkyl-2-substituted aminomethyl-5-nitroimidazoles are hydrolyzed to the corresponding 1-(hydroxyalkyl)imidazoles by treatment with a dilute mineral acid such as hydrochloric or sulfuric acid.

The reaction of 1-substituted-2-halomethyl-5-nitroimidazole with ammonia is not a satisfactory one. For this reason, the 1-substituted-2-aminoalkyl-5-nitroimidazoles of the formula

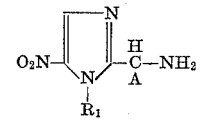

where $R_1$ and A are as previously defined, are prepared from the corresponding 2-haloalkylimidazoles by reacting the 1-substituted-2-haloalkyl-5-nitroimidazole with an alkali metal pthalimide to produce 1-substituted-2-phthalimidoalkyl-5-nitroimidazole, and treating this latter substance with hydrazine to form the 1-substituted 2-aminoalkyl-5-nitroimidazole. Reaction of the 2-halo imidazole with an alkali metal phthalimide is conveniently brought about a solvent medium inert under the reaction conditions. Dimethylsulfoxide, dimethylformamide and dimethylacetamide are examples of suitable solvents. Good results are obtained by intimately contacting the reactants in the solvent at temperatures of about 20–75° C. for up to 2 hours. In most cases the desired product, such as 1-methyl-2-phthalimidomethyl-5-nitroimidazole, 1-methyl-2-(α-phthalimidoethyl)-5-nitroimidazole, or 1-(2-acetoxyethyl)-2-phthalimidomethyl-5-nitroimidazole precipitates directly from the reaction mixture. The succeeding hydrazine reaction is conveniently brought about by intimately contacting the 2-phthalimidoalkyl imidazole and hydrazine at elevated temperatures of from 40–100° C. in a non-reactive solvent that dissolves both reactants. Lower alkanols and aqueous dimethyl formamide are examples of good solvents. In most cases the desired product can be crystallized directly from the reaction solvent. When this is not satisfactory, the solvent is removed and the imidazole purified by known techniques. In this way, 1-methyl-2-aminomethyl-2-aminomethyl-5-nitroimidazole, 1-ethyl-2-aminomethyl-5-nitroimidazole, 1-(2-acetoxyethyl)-2-aminomethyl-5-nitroimidazole, 1-(2-hydroxyethyl)-2-aminomethyl-5-nitroimidazole, and 1-methyl-2-(α-aminoethyl)-5-nitroimidazole are produced in good yield.

The 1-substituted-2-aralkylaminomethyl-5-nitroimidazole compounds of the invention are preferably made according to a process different from that previously described for the other 2-substituted-aminomethyl-imidazoles since the primary amines such as benzylamine and nuclearly substituted benzylamines do not on reaction with the 2-halomethyl-5-nitroimidazoles give high yields of the desired 2-aralkylaminomethyl-5-nitroimidazoles. It has been found that such substances may be obtained from 1-loweralkyl-2-(α-hydroxy-α-aralkylamino)methyl-5-nitroimidazole by a process that comprises dehydration of the latter compound with silica gel to 1-loweralkyl-2-aralkyliminomethyl-5-nitroimidazole, followed by reduction of said latter substance with an alkali metal borohydride or other selective reducing agent. I-loweralkyl-2-aralkylaminomethyl-5-nitroimidazole compounds are thus obtained, and may be isolated by known procedures. Examples of 5-nitroimidazoles contemplated by this invention and synthesized in this way are 1-methyl-2-benzylaminomethyl-5-nitroimidazole and 1-ethyl-2-benzylaminomethyl-5-nitroimidazole, as well as heteroalkyl compounds such as 1-methyl-2-pyridylmethylaminomethyl-5-nitroimidazole and 1-methyl-2-thienylmethylaminomethyl-5-nitromidazole. The aromatic ring of the benzyl radical may be substituted with radicals such as loweralkyl, halo, nitro, alkoxy and carboalkoxy.

The 1-substituted 2 - aminoalkyl-5-nitroimidazole and 1 - substituted-2-substituted-aminoalkyl - 5-nitroimidazole compounds of the general formula have a significant degree of antitrichomonal activity and are thus useful in the treatment of trichomoniasis, i.e., *T. vaginalis* vaginitis. When employed in treating the protozoan disease trichomoniasis, they are administered orally, uniformly dispersed in a pharmaceutically acceptable carrier vehicle, usually in tablets, capsules, syrups, solutions and the like. Tablets or capsules containing from about 100 to about 500 milligrams of active anti-trichomonal ingredient are quite satisfactory and are prepared by techniques known to those skilled in the pharmaceutical art. Thus, these dosage forms will contain normal diluents, excipients, lubricating agents, binders and extenders regularly employed in compounding solid oral dosage form. The drugs may, if desired, be suspended or dissolved in liquid vehicles designed for oral administration. Alternatively, they may be administered topically and for this purpose are distributed in topical formulations such as creams and jellies. The antitrichomonal activity of representative compounds of this invention is set forth below. Activity is expressed in terms of effective dose in mg./kg., as determined by the method described in Cuckler, Kupferberg & Millman, "Chemotherapeutic and Tolerance Studies on Aminonitro Thiazoles" Antibiotics and Chemotherapy, 5:540–550, 1955, and represents in vivo activity in mice.

| Compounds: | Activity (mg./kg.) |
|---|---|
| 1 - methyl - 2 - morpholinomethyl-5-nitroimidazole | 10 |
| 1 - methyl - 2 - piperidinomethyl-5-nitroimidazole | 33 |
| 1 - methyl - 2 - cyclopentylaminomethyl-5-nitroimidazole | 40 |
| 1 - methyl - 2 - pyrrolidinylmethyl-5-nitroimidazole | 10 |
| 1 - methyl - 2 - methylaminomethyl-5-nitroimidazole | 40 |

The compounds of this invention are also effective in controlling enterohepatitis in turkeys. For this purpose they are administered to turkeys mixed with an element of turkey sustenance, e.g. feed or drinking water. Good control of the disease is obtained when the imidazole compounds of the invention are incorporated in a turkey feed ration at levels from about 0.003% to about 0.1% by weight and preferably from about 0.0125% to 0.05% by weight, of the feed. The optimum concentration will depend to a large extent on the age of the birds, the severity of the infection and the particular nitroimidazole employed. With these feed levels good controls of the disease is realized with essentially no undesirable side effects or retardation of growth of the turkeys. When the turkey feed or turkey ration is employed as the carrier vehicle for the nitroimidazole compounds, it is desirable that the drug be uniformly mixed throughout the feed. This is accomplished by first preparing a promix or feed supplement composition wherein the active ingredient is present in concentrations from about 1% to about 40% by weight and where the carrier or diluent is a non-toxic orally ingestable vehicle. It is preferred that the carrier be a nutritive one, examples of which are corn distillers dried grains, wheat aborts, wheat middling, soybean meal, formentation residues and corn meal. These supplements or premixes are then uniformly mixed through the turkey ration by conventional techniques such as grinding or milling.

A second route of administration is by way of the drinking water of the turkeys. This is preferred when the turkeys are severly infected since the birds will normally continue to drink after they have stopped eating solid food. Somewhat higher dose levels are employed for the drinking water route than for the solid feed method of administration, and levels of the nitroimidazole compounds in the drinking water of from about 0.025% to about 0.1% by weight are quite satisfactory. Some of the amides of the invention are not highly water soluble, and when any such are used it is desirable to use suspending or emulsifying agents, or to make a water-soluble form of the drug.

The following examples are given for the purpose of illustration and not by way of limitation.

EXAMPLE 1

1-methyl-2-chloromethyl-5-nitroimidazole 1.0 gm. (0.0064 M) of 1-methyl-2-hydroxymethyl-5-nitroimidazole is dissolved in 100 ml. of refluxing benzene. To this hot solution is added 20 ml. of thionyl chloride. The solution is warmed on a steam cone for 20 minutes and then evaporated to dryness in vacuo. The residue of 1 - methyl-2-chloromethyl-5-nitroimidazole hydrochloride thus obtained is flushed several times with benzene to remove traces of thionyl chloride. (The 1-methyl-2-chloromethyl-5-nitroimidazole hydrochloride prepared in this manner is suitable for synthetic purposes without further purification.) It is further purified as follows: It is dissolved in 25 ml. of water and the solution made slightly alkaline (pH 8–9) with dilute sodium hydroxide and extracted with 3× 100 ml. of chloroform. The chloroform extracts are combined, backwashed with water and evaporated in vacuo to dryness to give substantially pure 1-methyl-2-chloromethyl-5-nitroimidazole.

The 1-methyl-2-chloromethyl-5-nitroimidazole is characterized as the p-toluene sulfonic acid salt: To a 20% (w./w.) solution of the imidazole in chloroform there is added a solution of excess p-toluene sulfonic acid in ether. The 1-methyl-2-chloromethyl-5-nitroimidazole p-toluene sulfonic acid salt precipitates and is recovered by filtration and dried to substantially pure material, M.P. 153–155° C.

When 1 - ethyl - 2-hydroxymethyl-5-nitroimidazole, 1-propyl-2-hydroxymethyl-5-nitroimidazole and 1-butyl-2-hydroxymethyl-5-nitroimidazole are treated with thionyl chloride according to the foregoing procedure, there are obtained 1-ethyl-2-chloromethyl-5-nitroimidazole, 1-propyl-2-chloromethyl-5-nitroimidazole and 1-butyl-2-chloromethyl-5-nitroimidazole, respectively.

Reaction of the above 1-loweralkyl-2-hydroxymethyl-5-nitroimidazole compounds with thionyl bromide instead of thionyl chloride, or with aqueous concentrated hydrogen bromide affords the corresponding 1-loweralkyl-2-bromomethyl-5-nitroimidazoles.

EXAMPLE 2

1-methyl-2-chloromethyl-5-nitroimidazole 3.10 gm. of dry, crystalline 1-methyl-2-hydroxymethyl-5-nitroimidazole is placed in a 250 ml. round bottom flask, and 20 ml. of thionyl chloride is added over a 2 minute period. The reaction mixture is allowed to stand at room temperature for about 30 minutes. The excess thionyl chloride is then removed by evaporation in vacuo and any residual thionyl chloride is removed by flushing the residue with 50 ml. of benzene. The solid crystalline 1-methyl-2-chloromethyl-5-nitroimidazole thus obtained (4.2 gm.) is dried under vacuum to remove traces of thionyl chloride.

EXAMPLE 3

1-methyl-2-piperidinomethyl-5-nitroimidazole 500 mg. of 1-methyl-2-hydroxymethyl-5-nitroimidazole is converted to the corresponding 2-chloromethyl compound by the method of Example 1. The resulting 1-methyl-2-chloromethyl-5-nitroimidazole hydrochloride is dissolved in 100 ml. of benzene and the resulting solution treated with 1.5 ml. of piperidine. The mixture is warmed at 50° C. for 15 minutes and then evaporated to dryness in vacuo. The resulting oil is diluted with 10 ml. of water and made alkaline to pH 10 with sodium hydroxide. The resulting aqueous solution is extracted with 3× 50 ml. of chloroform. The chloroform extracts are combined and evaporated to dryness in vacuo. The residue is dissolved in 5 ml. of chloroform and chromatographed over 15 gms. of alumina. The alumina is eluted with chloroform and the chloroform eluates concentrated to dryness to give 1 - methyl-2-piperidinomethyl - 5 - nitroimidazole. The product is recrystallized from acetone-ether to give material having a melting point of 83–85° C.

Reaction of piperidine with 1-ethyl-2-bromomethyl-5-nitroimidazole according to the above procedure affords 1-ethyl-2-piperidinomethyl-5-nitroimidazole.

When morpholine, pyrrolidine and N-methyl piperazine are employed in place of piperidine in the above reaction, the corresponding aminomethyl compounds are formed:

From morpholine, 1-methyl - 2 - morpholinomethyl-5-nitroimidazole, M.P. 116–117° C.

From pyrrolidine, 1-methyl - 2 - pyrrolidinomethyl-5-nitroimidazole, M.P. 64–65° C.

From N-methylpiperazine, 1-methyl-2-N'-methylpiperazinomethyl-5-nitroimidazole, M.P. 94–96° C.

EXAMPLE 4

1-methyl-2-dimethylaminomethyl-5-nitroimidazole (A) 500 mg. of 1-methyl-2-hydroxymethyl - 5 - nitroimidazole is converted to 627 mg. of 1-methyl-2-chloromethyl-5-nitroimidazole hydrochloride by the method of Example 1.

This 1 - methyl-2-chloromethyl - 5 - nitroimidazole hydrochloride is dissolved in 200 ml. of 1,2-dimethoxyethane and chilled to about −40° C. in a Dry Ice bath. 10 ml. of liquid dimethylamine is added with stirring and the resulting solution then allowed to warm to room temperature.

The solvent is then removed by evaporation in vacuo, and the residue dissolved in 20 ml. of water. The solution is made alkaline (pH 10) with 2.5 N sodium hydroxide. The aqueous alkaline solution is extracted with 3× 50 ml. of chloroform, and the combined chloroform extracts are dried over sodium sulfate, filtered and concentrated to dryness in vacuo.

The 1-methyl-2-dimethylaminomethyl-5-nitroimidazole thus obtained is dissolved in a minimum volume of ether and filtered. 600 mg. of p-toluene sulfonic acid in a minimum volume of ether is added with stirring. The p-toluene sulfonic acid salt of 1-methyl-2-dimethylaminomethyl-5-nitroimidazole precipitates and is recovered by filtration (671 mg.). It is recrystallized from methanol-ether to give substantially pure material, M.P. 188–189° C.

(B) When liquid monomethylamine is employed in the above method in place of liquid dimethylamine, 1-methyl-2-methylaminomethyl - 5 - nitroimidazole is obtained. The p-toluene sulfonic acid salt thereof melts at 198–200° C.

Reaction of 630 mg. of 1-propyl-2-chloromethyl-5-nitroimidazole with 10 ml. of diethylamine according to the foregoing procedure yields 1-propyl-2-diethylaminomethyl-5-nitroimidazole.

EXAMPLE 5

1-methyl-2-phthalimidomethyl-5-nitroimidazole (A) 2.2 gm. of 1-methyl-2-hydroxymethyl - 5 - nitroimidazole is converted to 1.75 gm. of 1-methyl-2-chloromethyl-5-nitroimidazole as previously described.

The chloromethyl compound is then dissolved in 10 ml. of dimethylsulfoxide and the solution stirred at room temperature while 3.5 gm. of potassium phthalimide is added. The mixture is stirred for an additional one and a half hours at room temperature and then for 30 minutes at 60° C.

The reaction mixture is diluted to 150 ml. with water and cooled in an ice bath. 1-methyl-2-phthalimidomethyl-5-nitroimidazole crystallizes and is recovered by filtration.

It is washed well with water and recrystallized from acetone-hexane, M.P. 180–184° C.

(B) 1-methyl-2-aminomethyl-5-nitroimidazole 200 mg. of 1-methyl-2-phthalimidomethyl-5-nitroimidazole is dissolved in 100 ml. of warm methanol. The solution is cooled to room temperature and 10 ml. of hydrazine hydrate are added. The mixture is stirred at room temperature for about 18 hours and then evaporated to dryness in vacuo. The resulting crystalline solid is suspended in 50 ml. of 2.5 N hydrochloric acid and stirred at 50° C. for 30 minutes. The solution is neutralized with 12 N sodium hydroxide and extracted with five 100 ml. portions of chloroform. The chloroform extracts are combined, dried over magnesium sulfate and evaporated to dryness in vacuo to give 1-methyl - 2 - aminomethyl-5-nitroimidazole as an oil. This oil is dissolved in 5 ml. of chloroform, and 350 mg. of p-toluene sulfonic acid in ether is added to the chloroform solution. The p-toluene sulfonic acid salt of 1-methyl - 2 - aminomethyl-5-nitroimidazole precipitates and is recovered by filtration. It is recrystallized from methanol to give substantially pure material, M.P. 231–234° C.

EXAMPLE 6

1-methyl-2-aminomethyl-5-nitroimidazole 286 mg. of 1-methyl-2-phthalimidomethyl-5-nitroimidazole is dissolved in 50 ml. of refluxing methanol, 0.25 ml. of hydrazine hydrate is added and the solution refluxed for 3 hours. It is then concentrated to 15 ml., and allowed to cool. The crystalline material that separates is removed by filtration and washed with 2× 15 ml. portions of cold methanol. The methanol washes and the filtrate are combined and evaporated in vacuo to dryness. The thus obtained residue is dissolved in 10 ml. of 1.25 N sodium hydroxide. The aqueous alkaline solution is extracted with 10× 20 ml. portions of chloroform. The chloroform extracts are combined and evaporated to dryness, in vacuo to give 1-methyl-2-aminomethyl-5-nitroimidazole.

This product is dissolved in 5 ml. of chloroform and 350 mg. of p-toluene sulfonic acid in a minimum amount of ether is added. The 1-methyl-2-aminomethyl-5-nitroimidazole p-toluene sulfonic acid salt precipitates and is collected by filtration. After recrystallization from methanol-ether it melts at 231–234° C.

EXAMPLE 7

1-methyl-2-anilinomethyl-5-nitroimidazole 1.51 gm. (8.6 mm.) of 1-methyl-2-chloromethyl-5-nitroimidazole is dissolved in 50 ml. of benzene. 5.0 ml. of aniline is then added with stirring and the solution allowed to stand at room temperature for ½ hour. The solution is warmed to reflux on the steam cone, and evaporated to dryness in vacuo. The resulting residue is dissolved in 20 ml. of 1.25 N sodium hydroxide and extracted with 3× 15 ml. of chloroform. The chloroform extracts are combined, filtered, dried and evaporated in vacuo to dryness.

The solid 1 - methyl - 2 - anilinomethyl-5-nitroimidazole thus obtained is dissolved in 50 ml. of 1:1 chloroform-ether and the solution treated with a small amount of activated charcoal. The solution is filtered, evaporated to a volume of about 10 ml. and triturated with hexane. The flask is chilled in the ice bath to complete crystallization of 1-methyl-2-anilinomethyl-5-nitroimidazole.

Recrystallization from isopropanol-ether affords pure 1 - methyl - 2 - anilinomethyl-5-nitroimidazole (1.95 gm.) M.P. 161–162° C.

EXAMPLE 8

When the procedure of Example 7 is repeated using equivalent molar amounts of N-methylpiperazine and cyclopentylamine in place of aniline, there is obtained, respectively:

1-methyl-2-N′-piperazinomethyl-5-nitroimidazole, M.P. 94–96° C., and 1 - methyl - 2-cyclopentylaminomethyl-5-nitroimidazole. This is a low melting solid and is characterized as its p-toluene sulfonic acid salt, M.P. 222–225° C.

EXAMPLE 9

1-methyl-2-[4-(2-ketopiperazinyl)-methyl]-5-nitroimidazole

To a solution of 4.0 gm. (0.019 m.) of 1-methyl-2-chloromethyl-5-nitroimidazole hydrochloride in 20 ml. of water, there is added, with stirring, 4.0 gm. (0.029 m.) of 2-ketopiperazine hydrochloride dissolved in 50 ml. of aqueous saturated sodium bicarbonate. The resulting solution is stirred for 2 hours at room temperature, and then for 15 minutes at 50° C.

The solution is cooled and extracted with 4× 300 ml. portions of n-butanol. The n-butanol extracts are combined and evaporated to dryness in vacuo. The crystalline residue of 1 - methyl - 2-[4-(2-ketopiperazinyl)-methyl]-5-nitroimidazole is dissolved in 500 ml. of refluxing acetone and filtered. The acetone is then distilled off in vacuo to leave 3.55 gm. of crystalline 1-methyl-2-[4-2-ketopiperazinyl)-methyl]-5-nitroimidazole.

Recrystallization from isopropanol affords 2.97 gm. of pure 1 - methyl-2-[4-(2-ketopiperazinyl)-methyl]-5-nitroimidazole, M.P. 187–188° C.

EXAMPLE 10

1-(β-hydroxyethyl)-2-morpholinomethyl-5-nitroimidazole 0.8 gm. (3.5 mm.) of 1-β-acetoxyethyl)-2-hydroxymethyl-5-nitroimidazole is dissolved in 50 ml. of benzene. The solution is warmed to reflux and 20 ml. of thionyl chloride added. The reaction mixture is refluxed for five minutes then evaporated in vacuo to dryness. The residue thus obtained is flushed with benzene and then dried in vacuo to remove any residual thionyl chloride. The resultant 1 - (β - acetoxyethyl)-2-chloromethyl-5-nitroimidazole hydrochloride is a white, crystalline, hydroscopic substance.

The 1 - (β - acetoxyethyl)-2-chloromethyl-5-nitroimidazole hydrochloride is dissolved in a minimum volume of benzene. 5.0 ml. of morpholine are added, and the mixture stirred at room temperature for 45 minutes. The reaction mixture is then concentrated to dryness in vacuo and the residue is dissolved in 20 ml. of water. The aqueous solution is made strongly alkaline (to pH 10) with aqueous NaOH and extracted with 3× 100 ml. portions of chloroform. The chloroform extracts are combined, filtered, dried and finally evaporated to dryness in vacuo.

The 1 - (β - acetoxyethyl)-2-morpholinomethyl-5-nitroimidazole (687 mg.) thus obtained is an oil containing small amounts of acetyl morpholine and 1-(β-hydroxyethyl) - 2 - morpholinomethyl - 5-nitroimidazole. It is dissolved in 10 ml. of ethanol and 10 ml. of 4 N hydrochloric acid and the solution refluxed for ½ hour. It is then evaporated in vacuo to dryness. The residue is dissolved in 10 ml. of water and neutralized with sodium hydroxide. The aqueous solution is extracted with 3× 50 ml. portions of ethyl acetate. The ethyl acetate extracts are combined, backwashed with water and evaporated in vacuo to dryness. The residual oil is crystallized from benzene-hexane to give 1-(β-hydroxyethyl)-2-morpholinomethyl-5-nitroimidazole. Recrystallization from benzene-hexane affords substantially pure material, M.P. 121–122° C.

The 1 - (β-acetoxyethyl) - 2-hydroxymethyl - nitroimidazole employed as starting material for this experiment is conveniently obtained by a process which is not a part of the present invention but which is rather the invention of our colleague Janos Kollonitsch, and which is the following:

1.4 g. of 1-(β - acetoxyethyl - 5 - nitroimidazole, 1.05 g. of paraformaldehyde and 5 ml. of dimethylsulfoxide are placed in a glass tube. The tube is sealed and heated at 110° C. for 24 hours. The mixture is then removed and concentrated to dryness in vacuo. The residue is extracted with 5 ml. of hot hexane. The hexane-insoluble material is dissolved in about 10 ml. of benzene. The benzene solution is concentrated to about a 5 ml. volume, and hexane added slowly to induce crystallization of 1-(β-acetoxyethyl)-2-hydroxymethyl-5 - nitroimidazole. The product thus obtained is recovered by filtration and air dried, M.P. 88–90° C. Yield: 81% of theoretical.

1-(β - hydroxyethyl) - 2-hydroxymethyl - 5-nitroimidazole is obtained by repeating the above experiment and using as starting material 1-(β-hydroxyethyl) - 5-nitroimidazole.

Other 1-$(CH_2)_n$OAc-2 - hydroxymethyl - 5-nitroimidazoles, where $n$ is 2, 3 or 4, and Ac is loweralkanoyl, e.g. acetyl, propionyl, butyroyl, or benzoyl, are obtained in similar fashion from the corresponding 1-$(CH_2)_n$OAc-5-nitroimidazoles.

EXAMPLE 11

1-methyl-2-benzylaminomethyl-5-nitroimidazole 0.7 gm. (2.7 mm.) of 1-methyl-2-α-hydroxy-α-benzylamino)-methyl-5-nitroimidazole is dissolved in 2.5 ml. of chloroform. This solution is rapidly chromatographed over 20 gm. of silica gel in a short, squat column. The column is eluted with ether. The ether eluates are evaporated in vacuo and the residue of 1-methyl-2-benzyliminomethyl-5-nitroimidazole is stored at 0–5° C. until just prior to use.

The 1-methyl-2-benzyliminomethyl-5-nitroimidazole is then dissolved in 50 ml. of 50% isopropanol methanol and the solution cooled to 0–5° C. 0.150 gm. of sodium borohydride is added with stirring, and the mixture is stirred and allowed to warm to room temperature over a 30 minute period.

The solution is then acidified to pH 5 with hydrochloric acid, and evaporated to dryness in vacuo. The residue is dissolved in 50 ml. of 1.25 N sodium hydroxide and extracted with 3×100 ml. portions of chloroform.

The chloroform extracts are combined, filtered, dried and evaporated in vacuo to dryness. The residue is dissolved in hot hexane, and treated while hot with a small amount of decolorizing charcoal. The charcoal is filtered off and the hexane solution evaporated, on the steam cone, until it becomes cloudy. The solution is then cooled. 1-methyl-2-benzylaminomethyl - 5-nitro - imidazole crystallizes and is recovered by filtration.

Recrystallization from isopropanol-hexane yields pure material, M.P. 73–75° C.

157 mg. of 1-methyl - 2-hydroxymethyl - 5-nitroimidazole and 348 mg. of activated manganese dioxide are refluxed together for two hours in 5 ml. of benzene. At the end of this time the manganese dioxide is removed by centrifuging and washed with hot benezene. The reaction solution and benzene washes are added to an equal volume of ether and the solution passed through 1 gm. of acid washed alumina. The eluate is concentrated in vacuo to dryness to leave a residue consisting of crystalline 1-methyl - 2-formyl - 5-nitroimidazole, M.P. 95–98° C.

0.5 gm. of 1-methyl - 2-formyl - 5-nitroimidazole is dissolved in 50 ml. of benzene and the solution cooled and stirred at 15° C. 0.5 ml. of benzylamine is added and stirring is continued for about 15 minutes at 15–20° C. The resulting crystalline product is removed by filtration, washed with hexane and recrystallized at room temperature from chloroform by the addition of petroleum ether. The crystals of 1-methyl - 2-(α-hydroxy-α-benzylamino)-methyl-5-nitroimidazole thus obtained melt with decomposition at 66–68° C.

EXAMPLE 12

10 gm. of 1-benzyl-2-hydroxymethylimidazole is heated for about 15 minutes with 10 ml. of thionyl chloride. The reaction mixture is then cooled and the resulting crystalline suspension diluted with about 10 ml. of ether. The crystalline 1-benzyl-2-chloromethylimidazole hydrochloride is recovered by filtration and washed with ether. It is air dried and 5 gm. of the product treated with 100 ml. of liquid ammonia for 24 hours in a pressure vessel at room temperature. The excess ammonia is then allowed to evaporate and the residual product extracted with 3× 30 ml. of ethyl acetate. The solvent extracts are combined, concentrated in vacuo to an oil which is dissolved in 25 ml. of concentrated hydrochloric acid. The acidic solution is evaporated to dryness in vacuo and the crystalline residue of 1-benzyl-2-aminomethylimidazole dihydrochloride recrystallized from ethanol-ether to give substantially pure material, M.P. 174–177° C.

6.4 gm. of 1-benzyl-2-aminomethylimidazole dihydrochloride is dissolved in a minimal volume of water and then mixed with 19 ml. of 2.5 N sodium hydroxide. The resulting mixture is extracted with 3× 10 ml. of chloroform and the combined chloroform extracts dried over magnesium sulfate and then evaporated to dryness to give 1-benzyl-2-aminomethylimidazole. This product is dissolved in about 40 ml. of liquid ammonia and the resulting solution treated with 1.6 gm. of metallic sodium. The mixture is stirred for 10 minutes and then a total of 5.8 gm. of solid ammonium chloride is added portionwise. The ammonia is allowed to evaporate and the residual product dissolved in 40 ml. of 2.5 N sodium hydroxide. 80 ml. of tetrahydrofuran is added and the mixture cooled in an ice bath. The resulting cold mixture is stirred and treated drop-wise with 20 ml. of acidic anhydride. 2.5 N sodium hydroxide is then added drop-wise until the mixture is basic. The reaction mass is then extracted with 3× 50 ml. of n-butanol and the combined butanol extracts evaporated to dryness. The residue thus obtained is extracted with hot acetone and the acetone extracts then evaporated to dryness to give crystalline 2-acetamidomethylimidazole. Recrystallization from acetone-ether yields substantially pure material, M.P. 183–188° C.

4 gm. of the above product is dissolved in 20 ml. of cold, concentrated nitric acid and the solution treated drop-wise with cooling with 20 ml. of cold, concentrated sulfuric acid. The resulting mixture is heated at 120° C. for one hour and then cooled and poured over 50 gm. of ice. The mixture is then made basic with potassium carbonate, extracted with 30 ml. of n-butanol, neutralized with dilute hydrochloric acid and then extracted with an equal volume of butanol. The butanol extracts are combined and concentrated to dryness in vacuo. The residue thus obtained is extracted with 2× 250 ml. of acetone. The acetone extracts are concentrated to an oil. This oil is triturated with 12 ml. of acetone and the resulting crystalline 2 - acetamidomethyl-4-(or-5)-nitroimidazole purified by recrystallization from methanol to give substantially pure material.

100 mg. of the latter product is heated at 100° C. with 0.06 ml. of dimethyl sulfate for 70 minutes. The reaction mixture is then cooled and about 1 cc. of water added to it. It is then made basic with dilute sodium hydroxide and extracted with 3× 3 ml. of chloroform. The chloroform extracts are dried over sodium sulfate and evaporated to dryness in vacuo to give a crystalline residue of 1-methyl-2-acetamidomethyl - 5 - nitroimidazole. Recrystallization from acetone-ether yields substantially pure material, M.P. 131–132° C.

EXAMPLE 13

1-methyl-2-(4-hydroxypiperidyl)-methyl-5-nitroimidazole

To a solution of 5.13 gm. of 1-methyl-2-chloromethyl-5-nitroimidazole in 100 ml. of methanol there is added, with stirring, 10 gm. of sodium bicarbonate followed by a solution of 3.5 gm. of 4-hydroxypiperidine in 100 ml. of methanol. The reaction mixture is stirred at room temperature for about 15 hours and then evaporated to dryness in vacuo. 100 ml. of water is added to the residue and the resulting mixture extracted with five 100 ml. portions of ethyl acetate. Each ethyl acetate extract is backwashed with 50 ml. of water. The ethyl acetate solutions are then combined and evaporated to dryness in vacuo to leave 5.7 gm. of a residue of 1-methyl-(4-hydroxypiperidyl)-methyl-5-nitroimidazole. This product is dissolved in about 20 ml. of hot isopropanol, the mixture filtered and the filtrate concentrated to a volume of 10 ml. This solution is cooled, whereupon 1-methyl-2-(4-hydroxypiperidyl)-methyl - 5 - nitroimidazole crystallizes. The product is recovered by filtration and dried to yield 4.1 gm., M.P. 139–146° C.

The same product is obtained by reacting an equimolar amount of 1-methyl-2-bromomethyl-5-nitroimidazole (instead of the chloromethylimidazole) with 4-hydroxypiperidine according to the above procedure.

EXAMPLE 14

1-methyl-2-allylaminomethyl-5-nitroimidazole 475 mg. of 1-methyl-2-chloromethyl-5-nitroimidazole is dissolved in 10 ml. of benzene. 1 ml. of allylamino is added to the benzene solution and the mixture warmed to the reflux temperature and refluxed for five minutes. It is then evaporated in vacuo to an oil and the oil is dissolved in 10 ml. of saturated aqueous potassium bicarbonate. The solution is extracted with three 25 ml. portions of chloroform. The chloroform extracts are combined, backwashed with 10 ml. of water, dried over magnesium sulfate and then evaporated in vacuo to an oil. The residue of 1-methyl-2-allylaminomethyl-5-nitroimidazole is dissolved in 5 ml. of chloroform and to this solution there is added 500 mg. of p-toluene sulfonic acid in 12.5 ml. of chloroform. The white crystalline product that forms is removed by filtration and recrystallized from methanol to give substantially pure 1-methyl-2-allylaminomethyl - 5 - nitroimidazole p-toluene sulfonic acid salt, M.P. 193–196° C. When 1-ethyl-2-chloromethyl-5-nitroimidazole is employed in the above experiment instead of 1-methyl-2-chloromethyl-5-nitroimidazole there is obtained the p-toluene sulfonic acid salt of 1-ethyl-2-allylaminomethyl-5-nitroimidazole.

EXAMPLE 15

1-methyl-2-(1'-imidazolyl)-methyl-5-nitroimidazole

To 1.01 gm. of 1-methyl-2-chloromethyl-5-nitroimidazole there is added 5 gm. of imidazole, the mixture is warmed and stirred until the imidazole melts. It is then heated at 140° C., with stirring, for 20 minutes and at the end of this time poured into 100 ml. of water. To the resulting solution there is added 3.5 gm. of sodium bicarbonate and the entire mixture is then extracted with five 200 ml. portions of ethyl acetate. The ethyl acetate extracts are separately backwashed with 50 ml. of water and then combined and dried over sodium sulfate. The sodium sulfate is removed by filtration and the ethyl acetate solution treated at room temperature with 1 gm. of decolorizing charcoal. The charcoal is then removed by filtration and the filtrate evaporated to dryness in vacuo to give 850 mg. of 1 - methyl - 2 - (1' - imidazolyl) - methyl - 5-nitroimidazole. This product is dissolved in 15 ml. of isopropanol and the solution concentrated to a volume of about 3 ml. It is then filtered and the filtrate cooled whereupon 1 - methyl - 2 - (1' - imidazolyl) - methyl - 5 - nitroimidazole crystallizes. The product is recrystallized from isopropanol to yield substantially pure material, M.P. 99–101° C.

EXAMPLE 16

1-methyl-2-morpholinomethyl-5-nitroimidazole

To 15.6 gm. of 1-methyl-2-hydroxymethyl-5-nitroimidazole in a 500 ml. flask there is added over a three minute period 50 ml. of thionyl chloride. The mixture is warmed to 50° C. for 30 minutes and at the end of this time, the excess thionyl chloride is evaporated in vacuo. The residue is flushed with 50 ml. of benzene. It is then cooled to about room temperature and 100 ml. of water added. The mixture is made alkaline with 2.5 N sodium hydroxide and the aqueous alkaline solution extracted with five 150 ml. portions of chloroform. Each chloroform extract is backwashed with 50 ml. of water. The chloroform extracts are then combined and evaporated to dryness in vacuo to afford 17.3 gm. of 1-methyl-2-chloromethyl-5-nitroimidazole. This product is dissolved in 500 ml. of benzene and a solution of 40 ml. of morpholine in 100 ml. of benzene is added. The mixture is stirred at room temperature for one hour and then warmed to 75° C. for about 5 minutes. It is then evaporated in vacuo to dryness. The residue is dissolved in 150 ml. of water and 50 ml. of saturated aqueous potassium bicarbonate solution is added. The resulting solution is extracted with five 200 ml. portions of chloroform, the chloroform extracts each washed with 100 ml. of water and then evaporated to dryness in vacuo. There is obtained 1-methyl-2-morpholinomethyl-5-nitroimidazole which on recrystallization from chloroform yields 20 gm. of substantially pure material, M.P. 118–119° C.

EXAMPLE 17

N'-carbamyl-1-methyl-2-aminomethyl-5-nitroimidazole

To 463 gm. of 1-methyl-2-aminomethyl-5-nitroimidazole in 5 ml. of ethanol is added 325 ml. of nitrouren in 5 ml. of 50% aqueous ethanol. The mixture is warmed gently on a steam bath for one hour and then evaporated to dryness on a steam bath in a nitrogen atmosphere. The residual product is dissolved in 2 ml. of methanol. It is chromatographed over 25 gm. of silica gel prepared in hexane. The column is washed successively with 200 ml. of chloroform, 50 ml. of chloroform containing 5 volume percent methanol, 50 ml. of chloroform containing 10 volume percent of methanol, and 85 ml. of chloroform containing 20 volume percent of methanol. The chloroform-20% methanol eluate is collected and evaporated to dryness in vacuo to give a residue of N'-carbamyl-1-methyl - 2 - aminomethyl - 5 - nitroimidazole. On recrystallization from isopropanol the product (340 mg.) melts at 165–170° C.

EXAMPLE 18

N-(1-methyl-5-nitro-2-imidazolylmethyl)-γ-pyridone 2.0 g. of 1-methyl-2-chloromethyl-5-nitroimidazole is dissolved in 10 ml. of dimethylformamide, and this solution added over a period of 10 minutes to a solution of 1.10 g. of γ-pyridone in 10 ml. of dimethylformamide previously treated with 535 mg. of 52% sodium hydride in oil. The mixture is stirred at room temperature for 2 hours and then diluted with 80 ml. of water. The mixture is extracted with three 50 ml. portions of methylene chloride. The methylene chloride extracts are combined, dried over $Na_2SO_4$ and evaporated to dryness in vacuo to leave a residue of crude N-(1-methyl-5-nitro-2-imidazolylmethyl)-γ-pyridone. The product is purified by recrystallization from isopropanol.

EXAMPLE 19

When the procedure of Example 16 is repeated using thiamorpholine in place of morpholine, 1-methyl-2-thiamorpholinomethyl-5-nitroimidazole is obtained.

Similarly, when 1 - methyl - 2 - (α - hydroxyethyl) - 5- nitroimidazole is reacted with thionyl chloride by the procedure of Example 1, there is produced 1-methyl-2-(α-chloroethyl) - 5 - nitroimidazole. On treatment of this substance with a molar excess of morpholine under the reaction conditions of Example 16, 1-methyl-2-α-morpholinoethyl)-5-nitroimidazole is produced.

In addition to those described in Example 10, the starting materials used in carrying out the processes and making the compounds of this invention are prepared in the following manner:

(a) 1-loweralkyl-2-hydroxymethyl-5 - nitroimidazole: 83.0 gm. (0.864 M) of 2-hydroxymethyl imidazole is dissolved in 200 ml. of acetic anhydride. The solution is allowed to stand overnight at room temperature. The acetate salt of 2-acetoxymethyl imidazole crystallizes. The crystalline solid is slurried well with ether, filtered and the crystals are washed with ether until the odor of acetic acid is no longer detectable. The 2-acetoxymethyl imidazole acetic acid salt melts at 80° C. The 2-acetoxy methyl imidazole acetic acid salt is dissolved in 10% sodium bicarbonate and the 2-acetoxymethyl imidazole extracted with ethyl acetate. Evaporation of the ethyl acetate extracts, in vacuo, and recrystallization of the residue from ethyl acetate affords 2-acetoxymethyl imidazole, M.P. 82–85° C.

176.6 gm. (0.882 M) of 2-acetoxymethyl imidazole acetic acid salt is added in small amounts to 165 ml. of cold, fuming 90% nitric acid. This solution is added slowly with stirring and cooling to 150 ml. of cold, fuming 90% nitric acid containing 90.1 gm. of gaseous $BF_3$. The reaction mixture is heated on the steam cone for five hours.

After cooling to room temperature, the reaction mixture is poured over ice and neutralized with sodium hydroxide. The resulting solution is then extracted with ethyl acetate, and the ethyl acetate extracts evaporated, in vacuo, to dryness. The residue is refluxed for one hour in a solution of 100 ml. of 2.5 N sodium hydroxide and 100 ml. of methanol. The solution is then neutralized with hydrochloric acid and extracted with ethyl acetate. The extracts are evaporated to dryness, dissolved in methanol and chromatographed over charcoal.

Elution of the charcoal with 50% ether-acetone first removes a small amount of imidazole-2-carboxaldehyde. The next substance eluted is 2-hydroxymethyl-4(5)-nitroimidazole. After recrystallization from acetone, this melts at 156–158° C.

12.6 gm. of dimethyl sulfate is added to 11.1 gm. of 2-hydroxymethyl-4(5)-nitroimidazole and the mass thoroughly mixed. The mass is then heated on the steam cone for two hours and cooled to room temperature.

A small amount of ice is added, and the remaining dimethyl sulfate and methyl hydrogen sulfate neutralized by slow addition of concentrated ammonium hydroxide. The resulting solution is extracted with chloroform. The chloroform extracts are separated and evaporated to dryness to yield a residue consisting of 1-methyl-2-hydroxymethyl-5-nitroimidazole. Recrystallization from acetone affords substantially pure 1-methyl-2-hydroxymethyl-5-nitroimidazole, M.P. 117–119° C.

When the above reaction is carried out using diethyl sulfate or dipropyl sulfate in place of dimethyl sulfate, there is obtained respectively 1-ethyl-2-hydroxymethyl-5-nitroimidazole and 1-propyl-2-hydroxymethyl - 5 - nitroimidazole.

(b) 1-loweralkyl-2-(α-hydroxyalkyl) - 5 - nitroimidazoles: 5 gm. of 1,2-dimethyl-5-nitroimidazole (0.035 M) and 18 ml. of benzaldehyde (0.18 M) are added to a mixture of 90 ml. of absolute ethanol and 6 gm. of potassium t-butoxide (0.054 M). The resulting mixture is heated at 70–75° C. in a water bath for 20 minutes. It is then cooled in an ice bath and the solid precipitate of 1-methyl-2-(β-phenyl-vinyl)-5-nitroimidazole removed by filtration. The solid is washed first with ethanol and then with water. The remaining crystalline product is 1-methyl- 2-(β-phenyl-vinyl)-5-nitroimidazole, M.P. 198–199° C. after air drying.

40 gm. of 1-methyl-2-(β-phenyl-vinyl)-5-nitroimidazole and 80 gm. of sodium periodate are added to a mixture of 800 ml. of 1,2-dimethoxyethane and 200 ml. of water at room temperature. 1 gm. of osmium tetroxide is then added and the mixture stirred for 17 hours at room temperature. The pale yellow reaction mixture which contains a heavy white precipitate is poured into 6 l. of water and the entire mixture extracted with three 1300 ml. portions of chloroform. The chloroform extracts are combined, dried over sodium sulfate and concentrated to dryness in vacuo to a brown oil. This oil crystallizes on cooling. The resulting crystalline residue is extracted with four 200 ml. portions of hot ethyl ether. The ether extracts are combined and diluted with an equal volume of hexane. The resulting solution is chromatographed over a column of 350 gm. of acid washed alumina prepared in 1:1 ether-hexane. The column is eluted with 1:1 ether-hexane to remove a colorless fraction containing 8.2 gm. of an oil having the odor of benzaldehyde. The column is then eluted with about 1.5 l. of ether and this eluate concentrated to a volume of about 350 ml. It is allowed to stand at room temperature for about 12 hours during which time about 4.1 gm. of 1-methyl-2-formyl-5-nitroimidazole crystallizes. The product is recovered by filtration and dried, M.P. 95–98° C.

500 mg. of 1-methyl-2-formyl-5-nitroimidazole in 20 ml. of dry ether is treated with one equivalent of methyl magnesium iodide in 17.8 ml. of ether. After refluxing for 15–20 minutes, 15 ml. addition ether and 6.7 ml. of 0.5 N hydrochloric acid are added. This mixture is warmed briefly, cooled and the phases separated. The ether phase is dried over $Na_2SO_4$ and taken to dryness in vacuo to leave 271 mg. of crude 1-methyl-2-(α-hydroxyethyl)-5-nitroimidazole. This is recrystallized once from ether-petroleum ether to give purified material. It is further purified by passage (in ethyl acetate) through acid washed alumina.

EXAMPLE 20

1-methyl-2-[4-(1,2,4-triazoyl)-methyl]-5-nitroimidazole

To a solution of 4.0 gm. (0.019 mole) of 1-methyl-2-chloromethyl-5-nitroimidazole hydrochloride in 20 ml. of water, there is added, with stirring, 2.0 gm. (0.029 mole) of 1,2,4-triazole dissolved in 50 ml. of aqueous saturated sodium bicarbonate. The resulting solution is stirred for 2 hours at room temperature, and then 2 hours at steam-bath temperature. The solution is cooled and extracted with 200 ml. of ethyl acetate. The ethyl acetate extracts are washed with water and evaporated to dryness in vacuo. The residue is then crystallized from ethyl acetate, affording 1 - methyl-2-[4-(1,2,4-triazoyl)methyl]-5-nitroimidazole.

EXAMPLE 21

1-methyl-2-(N-pyrrylmethyl)-5-nitroimidazole

Pyrrole [1.57 g.; .024 mole] is dissolved in 20 ml. of methanol. Potassium t-butoxide [2.6 g.; 0.024 mole] is added. After ten minutes warming on the steam-bath, the solvent was removed in vacuo, resulting in a solid residue of the pyrrole potassium salt.

1-methyl-2-chloromethyl-5-nitroimidazole (4.0 g.; 0.019 mole) is dissolved in 20 ml. of water, and saturated sodium bicarbonate solution is added until the mixture is slightly basic. The mixture was extracted with 50 ml. of benzene, and the benzene extract is washed with water and dried over sodium sulfate. The benzene solution is then added to the pyrrole sodium salt, prepared as above, and the resulting mixture is heated under reflux for one hour. Upon completion of the reaction the mixture is freed from precipitated potassium chloride by filtration, and concentrated in vacuo to dryness. The 1-methyl-2-(N-pyrrylmethyl)-5-nitroimidazole thus obtained is purified by recrystallization from a mixture of ethyl acetate and petroleum ether.

EXAMPLE 22

1-methyl-2-(N-pyrazolylmethyl)-5-nitroimidazole

1 - methyl-2-chloromethyl-5-nitroimidazole hydrochloride (10.0 g.; 0.048 mole) is dissolved in 50 ml. of water, and a solution of pyrazole (3.9 g.; 0.058 mole) in 125 ml. of saturated sodium bicarbonate solution is added dropwise with efficient stirring. The resulting solution is heated at 70–75° for two hours. After cooling, the mixture is extracted with 2× 100 ml. ethyl acetate. The extracts are combined, washed with 20 ml. of water, and concentrated in vacuo to a dry residue which is then recrystallized from acetone-ether to afford 1-methyl-2-(N-pyrazoylmethyl)-5-nitroimidazole.

EXAMPLE 23

N-(1-methyl-5-nitro-2-imidazolylmethyl)pyrrolidone

A solution of 1-methyl-2-chloromethyl-5-nitro-imidazole in benzene is prepared by dissolving the hydrochloride salt thereof (5.0 g.; 0.024 mole) in 25 ml. water; adding saturated sodium bicarbonate solution until the mixture is slightly alkaline; extracting the aqueous solution with benzene (100 ml.); and finally drying the benzene extract over sodium sulfate.

The potassium salt of 2-pyrrolidone is prepared by dissolving 2-pyrrolidone (2.2 g.; 0.029 mole) in 20 ml. of dry ethanol, adding potassium t-butoxide (3.3 g.; 0.030 mole); and warming the resulting mixture on a steam-bath for ten minutes. Removal of the solvent in vacuo affords a solid residue of the potassium salt.

The dry benzene solution of 1-methyl-2-chloromethyl-5-nitroimidazole is added to the solid potassium salt of 2-pyrrolidone and the mixture is heated under reflux for two hours. Removal of precipitated potassium chloride by filtration, followed by distillation of the solvent in vacuo affords N - (1 - methyl-5-nitro-2-imidazolyl-methyl)pyrrolidone which is purified by recrystallization from ethyl acetate.

Similarly, the potassium salt of α-pyridone is prepared as above and condensed with 1-methyl-2-chloromethyl-5-nitroimidazole to give N-(1-methyl-5-nitro-2-imidazolylmethyl)-α-pyridone.

When 2-pyrazolone is converted to its potassium salt as above and combined with 1-methyl-2-chloromethyl-5-nitroimidazole, 1-(1-methyl-5-nitro-2-imidazolylmethyl)-2-pyrazolone is obtained.

2-imidazolone is converted to its potassium salt in a similar manner and condensed with 1-methyl-2-chloromethyl-5-nitroimidazole to yield 1-(1-methyl-5-nitro-2-imidazolylmethyl)-2-imidazolone.

EXAMPLE 24

N-(1-methyl-5-nitro-2-imidazolylmethyl)benzamide 1-methyl-2-aminomethyl-5-nitroimidazole (3.0 g.; 0.019 mole) is dissolved in 10 cc. of dry pyridine. A solution of 5 cc. benzoyl chloride in 20 cc. of dry pyridine is added, and the resulting mixture is allowed to stand at room temperature for eighteen hours. The reaction mixture is poured over ice to decompose excess benzoyl chloride, and the precipitated product is collected by filtration, washed thoroughly with water, air-dried, and recrystallized from methanol to yield the desired product, N-(1-methyl-5-nitro-2-imidazolylmethyl)benzamide.

EXAMPLE 25

When the compounds of this invention are used for the treatment of trichomoniasis, they are generally compounded into suitable pharmaceutical formulations which include compressed tablets, coated tablets, capsules, suspensions or solutions for oral administration, and vaginal creams or suppositories for topical application. A typical example of a compressed tablet is:

| | Mg. per tablet |
|---|---|
| 1 - methyl - 2 - morpholinomethyl - 5 - nitroimidazole | 250 |
| Dicalcium phosphate | 100 |
| Lactose | 75 |
| Starch | 50 |
| Guar gum | 12 |
| Magnesium stearate | 2 |

The imidazole is uniformly mixed with the other components and the mixture then compressed into tablets. The ingredients of the tablets may be varied using a diluent (instead of dicalcium phosphate or lactose) such as kaolin, calcium sulfate, sucrose or sorbitol; a granulating agent (in place of starch) such as gum acacia or gum tragacanth; a disintegrant such as dried starch or cellulose (in place of guar gum); and a lubricant such as tak or stearic acid (in place of magnesium stearate) In addition, other 5-nitroimidazoles described herein may be substituted for the 1-methyl-2-morpholinomethyl-5-nitroimidazole used in the foregoing example.

Tablets may be sugar coated by applying a heavy sugar syrup, or enteric coated by spraying with a material such as cellulose acetate phthalate.

Capsules are prepared by blending the antitrichomonal agent with a filler such as starch, lactose or kaolin, and lubricating with calcium or magnesium stearate before encapsulation. A typical capsule has the composition:

| | Mg. |
|---|---|
| 1 - methyl - 2 - thiamorpholinomethyl - 5 - nitroimidazole | 250 |
| Calcium stearate | 2 |
| Lactose, to fill No. 0 capsule, ca. | 75 |

For vaginal creams the nitroimidazole compound is blended with sufficient quantities of hydrophilic ointment and water to give a cream of the desired consistency and containing 10% by weight of the imidazole. For vaginal suppositories, from 100–500 mg. of nitroimidazole compound of the invention is blended with about 5 grams of theobroma oil U.S.P. or a mixture of polyethylene glycols.

What is claimed is:

1. An antitrichomonal composition comprising a pharmaceutically acceptable carrier having dispersed therein as an effective antitrichomonal agent, 100 to 500 mg. of a compound of the formula

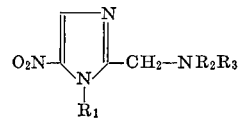

where $R_1$ represents loweralkyl having 1 to 5 carbon atoms or $(CH_2)_nOY$ where $n$ is an integer from 2 to 4 and Y represents hydrogen, loweralkanoyl having 2 to 4 carbons, benzoyl or p-nitrobenzoyl and —$NR_2R_3$ represents a member selected from the group consisting of morpholinyl, thiamorpholinyl and non-toxic acid addition salts thereof.

2. An antitrichomonal composition in the form of tablets, capsules or suppositories that comprises 100 to 500 mg. of a member selected from the group consisting of 1-methyl - 2 - morpholinomethyl - 5 - nitroimidazole and 1-(β-hydroxyethyl) - 2 - morpholinomethyl - 5 - nitroimidazole intimately and uniformly dispersed in a pharmaceutically acceptable carrier.

References Cited

UNITED STATES PATENTS 3,341,549  9/1967  Henry _____ 260—309

STANLEY J. FRIEDMAN, Primary Examiner

A. J. ROBINSON, Assistant Examiner

U.S. Cl. X.R.

424—246